Figure 1:
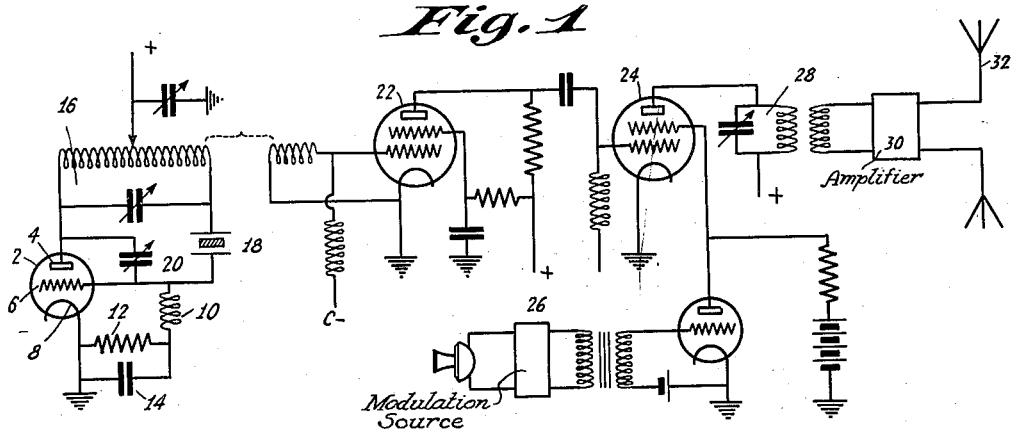

April 23, 1935.  C. W. HANSELL  1,998,928
CRYSTAL CONTROLLED OSCILLATOR
Filed May 27, 1931  3 Sheets-Sheet 1

INVENTOR
CLARENCE W. HANSELL
BY
ATTORNEY

April 23, 1935.  C. W. HANSELL  1,998,928
CRYSTAL CONTROLLED OSCILLATOR
Filed May 27, 1931   3 Sheets-Sheet 2

INVENTOR
CLARENCE W. HANSELL
BY
ATTORNEY

April 23, 1935.  C. W. HANSELL  1,998,928
CRYSTAL CONTROLLED OSCILLATOR
Filed May 27, 1931   3 Sheets-Sheet 3

INVENTOR
CLARENCE W. HANSELL
BY
ATTORNEY

Patented Apr. 23, 1935

1,998,928

UNITED STATES PATENT OFFICE 1,998,928

CRYSTAL CONTROLLED OSCILLATOR

Clarence W. Hansell, Port Jefferson, Long Island, N. Y., assignor to Radio Corporation of America, a corporation of Delaware Application May 27, 1931, Serial No. 540,310

12 Claims. (Cl. 250—36)

This invention relates to the generation of high frequency undulatory electrical currents and deals in particular with electron discharge device oscillators having piezo-electric crystals for controlling the frequency of oscillation thereof.

Although piezo-electric crystals have been used successfully for controlling the frequency of operation of electron discharge device oscillators, I have found that, due to the interelectrode capacity of the crystal as well as the capacity effect in the crystal itself, there is a tendency for parasitic oscillation generation at frequencies other than that corresponding to a natural frequency of the crystal. A prime desideratum for the generation of oscillations more constant in frequency than heretofore possible with the aid of piezo-electric crystals is, therefore, the removal of the effects of the interelectrode capacity of the piezo-electric crystal, and accordingly, a principal object of the present invention is to provide an electron discharge device oscillator, piezo-electrically controlled, wherein the effects of interelectrode capacity of the crystal are eliminated. Briefly, to do so, according to my present invention, I provide means for the neutralization of the interelectrode capacity of the crystal whereby the interelectrode capacity of the crystal has no effect on the frequency of oscillations generated by the electron discharge device oscillator.

Still a further object of my present invention is to provide an electron discharge device oscillator having preferably a tunable output circuit together with means for preventing the effects of interelectrode feed back within the device and, means for establishing desired feed back as well as for frequency controlling the oscillations, the last mentioned means comprising a piezo-electric crystal whose interelectrode capacity is neutralized.

Still another object of my present invention is to provide an electron discharge device oscillator wherein the frequency controlling means, preferably in the form of a crystal, is connected to a point of low impedance in the control grid circuit of the oscillator. This arrangement offers the advantage that the band of frequencies which can pass the crystal with sufficient strength to produce oscillations is materially reduced.

Other objects as well as advantages of my present invention will become apparent as the description thereof proceeds. In the accompanying drawings I have illustrated several modifications of my improved crystal oscillator, which, of course, are not to be considered in any way as limiting my present invention, but the invention itself is to be given the scope indicated by the appended claims.

Figure 2:
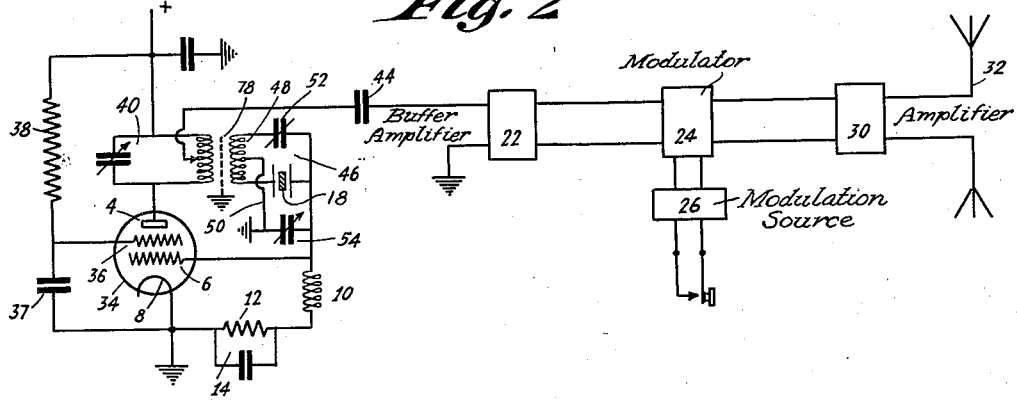
Figure 2A:
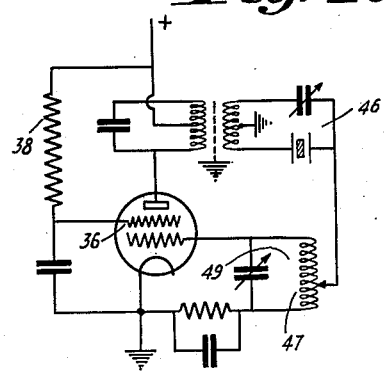
Figure 2B:
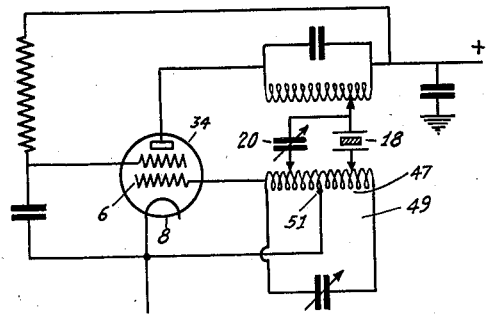

Figure 1 illustrates a transmitter utilizing an improved piezo-electric crystal controlled oscillator according to my present invention, Figure 2 illustrates another transmitter using my improved piezo-electric crystal oscillator wherein interelectrode capacity of the electron discharge device of the oscillator is eliminated by the use of a screen grid tube, Figs. 2a and 2b are modifications of the arrangement shown in Fig. 2, Figures 3 to 9 inclusive indicate various modifications of my improved oscillator.

Turning to Figure 1, an electron discharge device 2 having an anode 4, control electrode or grid 6 and cathode 8, has an input circuit comprising radio frequency choke 10, and a resistance 12 shunted by a condenser 14 connected in series between the grid and cathode. A tunable circuit 16 comprising an inductance coil shunted by a variable condenser is coupled to the anode, and, through a piezo-electric crystal 18 to the control electrode or grid 6. By means of a variable condenser 20 connected between the anode or plate 4 and grid 6, the dielectric capacity across the crystal which includes, of course, the interelectrode capacity of the crystal 18, is balanced out. In this manner, the frequency of oscillations generated by electron discharge device oscillator 2 is maintained very constant and independent of the interelectrode capacity of crystal 18.

Output energy from the tunable output circuit 16 may be inductively fed, as indicated, to a buffer amplifier 22 in turn feeding a modulating tube 24 preferably of the screen grid type. By varying the potential on the screen grid of tube 24 by modulating potentials from a modulating source 26, modulated high frequency energy of a frequency corresponding to that generated by piezo-electric crystal controlled oscillator 2, appears in the output circuit 28 of modulator 24. Modulated energy in the output circuit may then be amplified in a suitable amplifier 30 and then propagated to any number of receiving stations by means of a radiating antenna 32. If desired, frequency multipliers and amplifiers may be inserted between the buffer amplifier 22 and modulator 24.

In Figure 2, I have illustrated a modified crystal controlled electron discharge device oscillator 34 having an anode 4, a screen grid or electrode 36 adjacent the anode 4, and, a grid or control electrode 6 adjacent the cathode 8. The screen grid 36 is maintained at a suitable potential by the action of a resistor 38, and, the grid 6 is maintained at a suitable bias by the action of resistor 12 and shunting condenser 14 connected in the input circuit. It is to be noted that radio frequency choke 10 and condenser 14 may be omitted if found desirable. A tunable output circuit 40 is provided from which output energy may be fed to a buffer amplifier 22 through conductor 42 and blocking condenser 44.

By the action of screen grid 36, suitably grounded by radio frequency by-passing condenser 37, the effects of inter-electrode feed back, namely, parasitic oscillation generation, is effectively prevented. In order to establish feed back for the generation of oscillations at a constant predetermined frequency, I couple a circuit 46 to both the output circuit 40 and the input circuit of electron discharge device 34. This link circuit or filter circuit comprises a piezo-electric crystal 18 coupled to the output circuit 40 by means of a coupling coil or reactor 48 grounded at a point intermediate its ends by conductor 50, the grounding point chosen being preferably at the center of coil 48. One end of the coil, as shown, is connected to one electrode of crystal 18 and the other is connected through a neutralizing condenser 52 to the other electrode of crystal 18. In this manner, only energy of a frequency corresponding to the natural frequency of the piezo-electric crystal is fed from the tunable output circuit 40 of oscillator 34 to the input circuit thereof thereby producing an oscillation generator generating oscillations very constant in frequency and corresponding to that of a natural frequency of the crystal 18. To complete the tuning of the grid and filter circuits, a variable condenser 54 may be provided, but this condenser may be omitted if desired.

As already indicated, the choke 10 and by-passing condenser 14 may both be omitted also. In general, in order that the feed back through the crystal may be limited to a small band of frequencies it is desirable that the input circuit from the control grid to cathode have an impedance rather low and approximately of the same order of magnitude as the impedance across the crystal at resonance. For example, the crystal impedance at resonance may approximately be between 100 and 500 ohms. One way of obtaining this low impedance would be to omit choke coil 10 and choose a by-pass condenser around resistance 12 having such a reactance that for the desired frequency of operation the impedance of the condenser and resistance combination would be of the same order of magnitude as the minimum impedance across the crystal. Still another way of obtaining the low impedance is to omit coil 10 and condenser 14 and to make resistor 12 have a desired low value of resistance. In this case it may be advantageous to add a source of negative potential, shunted by a by-pass condenser, in series with resistor 12. This source of negative potential may be needed to give the grid 6 sufficient bias to make tube 34 function efficiently.

In Figures 2a and 2b, I have shown modified oscillator circuits wherein the frequency controlling means, shown in the form of a crystal, feeds energy to a point of low impedance on the grid control circuit. The voltage fed to the control grid circuit is, however, stepped up before actual application to the controlling grid. Thus, referring in particular to Figure 2a, which shows a circuit similar to that shown in Figure 2, energy passed by the link circuit 46 is fed to a point 47 of low impedance in the tunable grid control circuit 49. Although the energy fed back to the grid circuit 49 is fed to a point of low impedance, the voltage between the low impedance point 47 and the cathode or ground is stepped up by auto-transformer action of the tunable circuit 49 to a suitable operating value. In other words, the low impedance between the crystal and the cathode is stepped up to the high impedance of the grid.

In the arrangement shown in Figure 2b, the crystal 18 has provided for it on the grid side thereof, a low impedance between the tapping point 47 on tunable grid circuit 49 and the point 51 of substantially zero alternating potential. Neutralization of the interelectrode capacity of the crystal is provided by means of a neutralizing condenser 20. Interelectrode feed back is prevented by the use of suitable screen grid electron discharge device 34. As in Figure 2a, the arrangement shown in Figure 2b steps up the impedance which the crystal faces on the input or grid circuit side thereof to the impedance between the grid 6 and cathode 8.

By such procedure, as already pointed out, the low impedance on the grid circuit side of the frequency controlling means or crystal acts to appreciably narrow the frequency band in which enough energy is passed by the crystal to produce sustained oscillation generation thereby still further enhancing the frequency constancy of the oscillation generators according to my present invention.

Output energy from buffer amplifier 22 may be frequency multiplied and modulated in a suitable modulator 24 by the action of modulating means 26. The modulated energy may be further amplified by suitable apparatus 30 and radiated by means of a radiating antenna 32.

It is to be clearly understood that the oscillation generating systems shown are not limited in application to transmitters, but, may be used equally as well in other apparatus such as, for example, superheterodyne receivers which require local oscillators of constant frequency.

Figure 3:
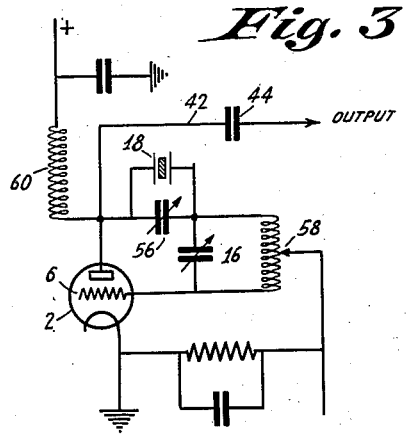

In the oscillator shown in Figure 3 the interelectrode capacity of crystal 18 is balanced by the interelectrode capacity of electron discharge device 2 and more particularly by the capacity between the anode and control grid 6 thereof. The split tunable circuit 16 completes the neutralization circuit and serves to reverse the polarity or phase of the potential introduced through the crystal to the grid 6. In the event that the effect of interelectrode capacity of tube 2 is not equal to that of crystal 18, a variable condenser 56 shunting the interelectrode capacity of crystal 18, or the plate to grid capacity may be provided. A similar variation in capacity may be made by varying the spacing of the electrodes for crystal 18. Preferably the tap 58 should be placed nearer to the grid end than to the plate end of circuit 16. Then the circuit 16 will serve as a voltage reducing transformer to reduce the alternating current anode potential to the lower potential desired for the grid.

Rather than make capacity adjustments for exact neutralization, complete neutralization of the capacity of the piezo-electric crystal may be obtained by making the position of tap 58 on the coil of the tunable circuit 16 adjustable.

Output energy may be taken through a lead 42 and blocking condenser 44, the lead being connected either to a point on plate impedance 60 or directly to the anode of tube 2 as indicated.

Figure 5:
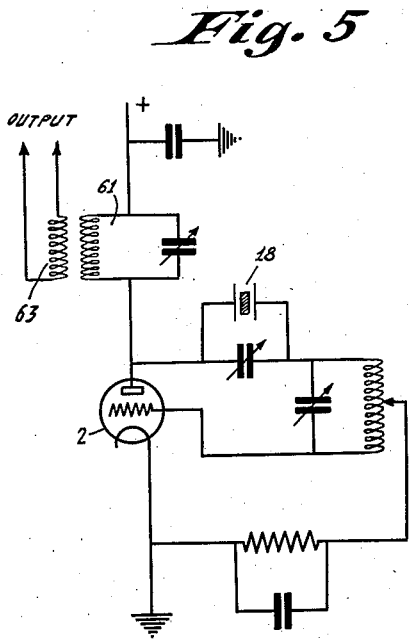

The impedance 60 may take the form of a tunable circuit 61 as illustrated in Figure 5, and, output energy may be derived from the oscillator 2 by coupling a suitable output coil 63 to the tunable anode circuit 61.

Figure 4:
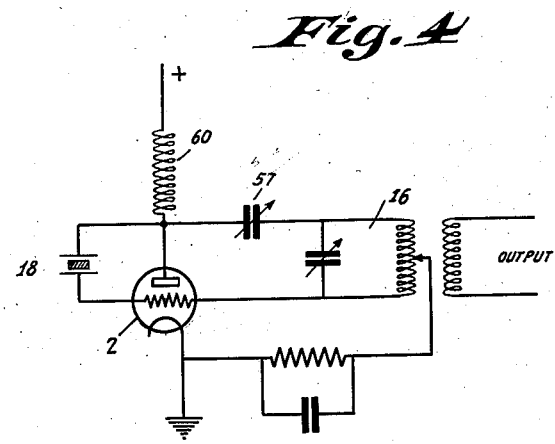

Another arrangement of the crystal and means for neutralizing the interelectrode capacity is shown in Figure 4. Here, the piezo-electric crystal 18 is connected in parallel to the anode and grid of electron discharge device oscillator 2, neutralization being effected by the use of a variable neutralizing condenser 57. Output energy, as shown, may be taken inductively from the tunable circuit 16 connected at different points to the anode, grid and cathode of electron discharge device oscillator 2.

Figure 6:
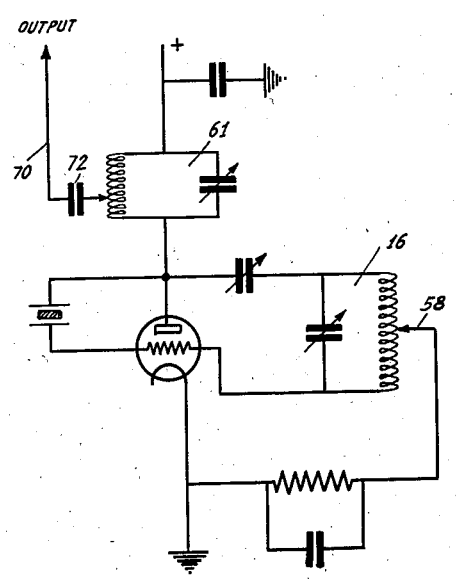

A modified form of the circuit shown in Figure 4 is illustrated in Figure 6, the anode impedance 60 of Figure 4 being replaced in Figure 6 by an impedance in the form of a tunable circuit 61 from which output energy may be taken by means of a connection 70 thereto through a suitable blocking condenser 72. As stated, in connection with the apparatus shown in Figure 3, an additional neutralizing adjustment may be afforded by varying the position of the cathode tap 58 on the tunable circuit 16.

Figure 7:
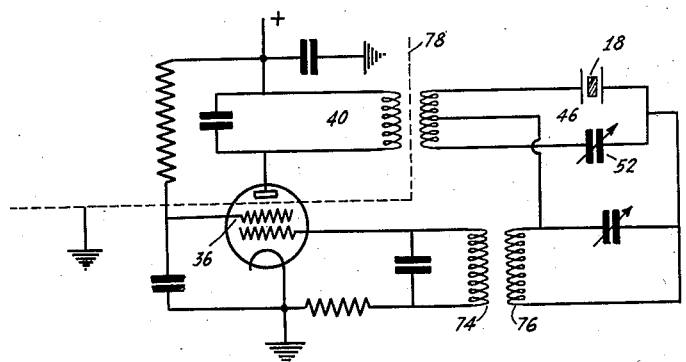

Still another arrangement for insuring feed back from the output circuit of an electron discharge device oscillator to the input circuit thereof only through a piezo-electric crystal itself and not through extraneous interelectrode capacities, is illustrated in Figure 7. Here, the electron discharge device oscillator is provided with a screen grid 36 to prevent interelectrode feed back. Between the tunable output circuit 40 and the input coupling coil 74 there is provided a filter circuit 46 comprising a piezo-electric crystal 18, a split input coil 48 and a neutralizing condenser 52. The output of the crystal filter circuit or link circuit 46 is fed inductively from output coil 76 to the input coil 74.

To prevent electrostatic feed back through the link circuit as a whole, screens or shields 78 suitably grounded should be provided. Such a shield should also be provided in an arrangement such as illustrated in Figure 2 between the tunable circuit 40 and the split input coil for the crystal filter circuit 46.

Figure 8:
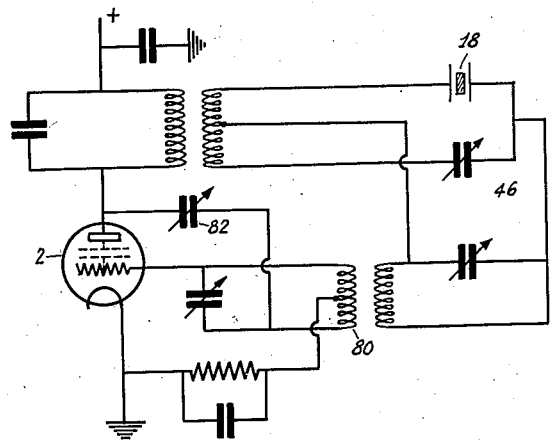

Rather than use a screen grid to prevent interelectrode feed back, the electron discharge device oscillator 2, as shown in Figure 8, may be neutralized by the use of a split input coil 80 and neutralizing condenser 82, and, a neutralized piezo-electric crystal filter circuit 46 may then be used to establish feed back from the output circuit to the input circuit of electron discharge device 2 thereby causing the generation of oscillations at a frequency closely corresponding to that of the piezo-electric controlling crystal 18.

Figure 9:
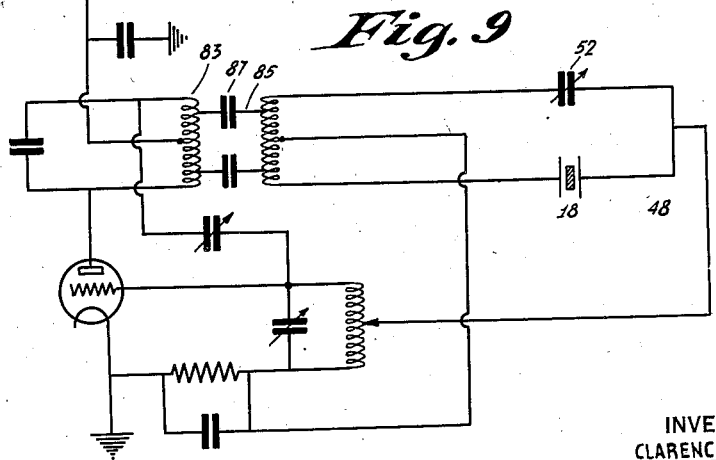

In Figure 9 the electron discharge device oscillator 2 is shown as having split output coil type of neutralization, feed back being established by the use of a neutralized capacity filtering circuit 46. The split output coil 83 is coupled through lines 85 and blocking condensers 87 to the crystal filter circuit, blocking condensers 87 being used to prevent the application of anode potentials to the filter circuit and control grid of electron discharge device oscillator 2. Neutralization of the interelectrode capacity of the piezo-electric crystal 18 is affected by the use of a variable neutralizing condenser 52. The output of the filter is tapped at a low impedance point on the grid input circuit in order to improve the effect of the crystal upon the frequency of the oscillator.

It should be obvious that there are many other detailed circuit combinations embodying the fundamental ideas of my present invention and, accordingly, it is not to be construed as limited by the various forms illustrated in the attached drawings, but, my present invention is to be given the full scope and width indicated by the appended claims.

Having thus described my invention, what I claim is:

1. An electron discharge device oscillator comprising an electron discharge device having an anode, a cathode, and a grid, a circuit comprising a piezo-electric crystal coupling the anode to the grid, and, a circuit connected between said grid and said cathode having at resonance an impedance of the order of magnitude of the minimum impedance across the crystal at resonance.

2. An electron discharge device oscillator having an anode, a cathode, and a control grid, an output circuit coupled to said anode, an input circuit coupled between said grid and cathode, means for preventing the effects of interelectrode feed back between the electrodes of said electron discharge device, and, a piezo-electric crystal coupling said output circuit to said input circuit, the portion of said input circuit between said crystal and said cathode having an impedance of the order of magnitude of the minimum impedance across said crystal at resonance.

3. In a system for generating high frequency oscillations, an electron discharge device having an anode, a cathode, and a grid, an output circuit coupled to said anode, an input circuit connected across said grid and cathode, means for preventing the effects of interelectrode capacity of said electron discharge device, a piezo-electric crystal for establishing feed back from said anode to said grid, and, means for neutralizing the interelectrode capacity of said piezo-electric crystal, the part of said input circuit between said crystal and said cathode having an impedance of the order of magnitude of the minimum impedance across said crystal at resonance.

4. In a system for generating high frequency electrical oscillations, an electron discharge device having an anode, a cathode, and a grid, an output circuit coupled to said anode, and, resonant frequency controlling means coupling said output circuit to the grid circuit of said electron discharge device, said frequency controlling means being coupled to a point on the grid circuit of said electron discharge device such that the impedance between said point and said cathode is substantially of the same order of magnitude of the impedance across the frequency controlling means at resonance.

5. In a system for generating high frequency oscillations, an electron discharge device having an anode, a cathode, and a grid, an output circuit coupled to said anode, an input circuit coupled to said grid, and, a piezo-electric crystal for coupling said output circuit to said input circuit, said piezo-electric crystal being coupled to a point on said input circuit such that the impedance between said point and cathode is of the order of magnitude of the impedance across the crystal at resonance.

6. A generator of oscillations of constant frequency comprising an electron discharge device having an anode, a cathode and a control electrode, a piezo-electric vibrator connected between said control electrode and cathode, and, a relatively low impedance connected in shunt to said control electrode and cathode said impedance being of the order of magnitude of the impedance across said piezo-electric vibrator at its operating frequency.

7. In apparatus of the character described, a vacuum tube having an anode a cathode and a control electrode, an electromechanical vibrator connected between said control electrode and cathode, and, a relatively low impedance connected directly in shunt with said cathode and control electrode said impedance being of the order of magnitude of 100 to 500 ohms at the operating frequency of said electromechanical vibrator.

8. In combination, a vacuum tube having an anode, a cathode and a control electrode, an electromechanical vibrator connected between two of said electrodes, and, a relatively low impedance connected directly in shunt with said two electrodes said low impedance being of the order of magnitude of the impedance across said vibrator at its operating frequency.

9. A generator of oscillations of constant frequency comprising an electron discharge device having an anode a cathode and a control electrode, a piezo-electric vibrator connected between said control electrode and cathode, and, a relatively low resistance connected effectively in shunt to said control electrode and cathode said resistance being of the value of the order of magnitude of the impedance across said piezo-electric vibrator at its operating frequency.

10. In apparatus of the character described, a vacuum tube having an anode, a cathode and a control electrode, an electromechanical vibrator connected between said control electrode and cathode, and, a relatively low resistance connected effectively directly in shunt with said cathode and control electrode said resistance being of the order of magnitude of the resistance across said electromechanical vibrator at resonance.

11. An oscillation generator comprising an electron discharge device having an anode a cathode a grid and a screen grid, means connecting said screen grid to said cathode for preventing anode to grid feed back, a piezo-electric crystal coupling said anode to said grid for establishing desired feed back, a circuit connected between the grid and cathode having an impedance of the order of magnitude of the impedance across said crystal at resonance, and means for preventing the effects of feed back through the interelectrode capacity of said crystal.

12. An oscillation generator comprising an electron discharge device having an anode a cathode a screen grid and a control grid, a circuit having inductance and capacity connected between said anode and cathode, a circuit connected between said control grid and cathode, means connected to said screen grid to prevent interelectrode feed back within said tube, a circuit comprising a piezo-electric crystal coupling said anode-cathode circuit to said control grid-cathode circuit, said control grid-cathode circuit having an impedance of the order of magnitude of the impedance across the crystal at resonance, and means for preventing feed back through the interelectrode capacity of said crystal whereby the feed back from said anode circuit to said control grid-cathode circuit occurs substantially solely by virtue of the piezo-electric effect of said crystal.

CLARENCE W. HANSELL.